United States Patent

Maeda

(10) Patent No.: US 10,062,150 B2
(45) Date of Patent: Aug. 28, 2018

(54) IMAGE PROCESSING APPARATUS, IMAGE CAPTURING APPARATUS, AND STORAGE MEDIUM

(71) Applicant: CANON KABUSHIKI KAISHA, Tokyo (JP)

(72) Inventor: Koji Maeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/252,697

(22) Filed: Aug. 31, 2016

(65) Prior Publication Data

US 2017/0061587 A1 Mar. 2, 2017

(30) Foreign Application Priority Data

Sep. 1, 2015 (JP) ................. 2015-171719

(51) Int. Cl.
*G06T 5/00* (2006.01)
*G06T 5/20* (2006.01)
*G06T 5/50* (2006.01)
*H04N 5/217* (2011.01)
*H04N 5/357* (2011.01)

(52) U.S. Cl.
CPC .............. *G06T 5/003* (2013.01); *G06T 5/20* (2013.01); *G06T 5/50* (2013.01); *H04N 5/217* (2013.01); *H04N 5/3572* (2013.01); *G06T 2207/10024* (2013.01); *G06T 2207/10052* (2013.01); *G06T 2207/20056* (2013.01)

(58) Field of Classification Search
CPC ......... G06T 5/001; G06T 5/002; G06T 5/003; G06T 2207/20056; G06T 2207/10024; G06T 5/20; G06T 5/50; G06T 2207/10052; H04N 5/3572; H04N 5/217; H04N 5/2356
USPC ........................................ 382/255, 275, 260
See application file for complete search history.

(56) References Cited

U.S. PATENT DOCUMENTS

| 4,410,804 A | 10/1983 | Stauffer | |
| 2013/0329094 A1* | 12/2013 | Ranalli | ............... H04N 5/265 348/241 |

(Continued)

FOREIGN PATENT DOCUMENTS

| JP | 2001083407 A | 3/2001 |
| JP | 2012073691 A | 4/2012 |

OTHER PUBLICATIONS

Tao, Michael W., et al. "Depth from combining defocus and correspondence using light-field cameras." Proceedings of the IEEE International Conference on Computer Vision. 2013.*

(Continued)

*Primary Examiner* — Geoffrey E Summers
(74) *Attorney, Agent, or Firm* — Carter, DeLuca, Farrell & Schmidt, LLP

(57) ABSTRACT

An image processing method includes the steps of obtaining information on an optical transfer function used for image capturing, generating correction information used to correct the optical transfer function based on a first image generated by the image capturing and a second image that is focused on a defocus area in the first image, and performing a filter process for the first image using the correction information and information on the optical transfer function.

7 Claims, 5 Drawing Sheets

(56) References Cited

U.S. PATENT DOCUMENTS

2014/0139705 A1* 5/2014 Ebe ................ H04N 5/217
                                                348/234
2015/0279073 A1* 10/2015 Ikeda ............ G06K 9/6201
                                                382/190
2017/0076430 A1* 3/2017 Xu ................. H04N 5/76

OTHER PUBLICATIONS

Johnson, Steven G. "Notes on FFT-based differentiation." (2011).*

* cited by examiner

IMAGE PROCESSING APPARATUS, IMAGE CAPTURING APPARATUS, AND STORAGE MEDIUM

BACKGROUND OF THE INVENTION

Field of the Invention

The present invention relates to an image processing technology configured to perform image processing for an image generated by image capturing.

Description of the Related Art

An image obtained by an image capturing apparatus, such as a digital camera, may deteriorate due to aberrations, such as a spherical aberration, a coma, a curvature of field, and an astigmatism of an image capturing optical system. These aberrations can be expressed by a point spread function ("PSF"). An optical transfer function ("OTF") obtained by Fourier-transforming the PSF contains frequency component information of the aberration, and can be expressed by a complex number. A modulation transfer function ("MTF") is an absolute value or an amplitude component of the OTF, and a phase transfer function ("PTF") is a phase component of the OTF. The MTF and PTF are frequency characteristics of the amplitude and phase components in the image deterioration caused by the aberration.

Since the OTF of the image capturing optical system affects (deteriorates) the MTF and PTF of the image generated by image capturing, the image becomes a deteriorated image in which each point asymmetrically blurs like the coma. Since the PSF is different according to a color component, such as red, blur, and green, in the image, a blur differs according to the color component and the deteriorated image is a color blurred image.

A known method for correcting a blur (deterioration) in an image uses information of the OTF of the image capturing optical system. This method is also referred to as an image recovery or an image restoration, and a process for correcting (reducing) the deteriorated image using the OTF information of the image capturing optical system will be referred to as an "image restoration process" hereinafter. One conventional method of the image restoration process is a method of convoluting an image restoration filter in a real space having an inverse characteristic of the OTF with an input image, although it will be described in detail later.

A more accurate OTF of the image capturing optical system is necessary for a more effective image restoration process. The OTF can be obtained through a calculation using design value information on an image capturing optical system. The OTF can be also calculated by Fourier-transforming an intensity distribution of a captured point light source.

The OTF changes according to an image capturing condition, such as an F-number and a focal length (zooming state) of an image capturing optical system, and an image height on an image capturing plane. The OTF also changes according to a focus state of the image capturing optical system for the object. Therefore, the image restoration filter used for the image restoration process is different according to a position (image height) in the image and a distance to the object contained in the image (or the focus state in the image capturing optical system). When the same image restoration filter is applied to the entire image, a false color occurs in a partial area having a different characteristic of the image restoration due to the OTF that differs caused by the image height and the focus state. Thus, in order to perform a good image restoration process for the entire deteriorated image, it is necessary to apply a proper image restoration filter to each partial area in the designated image.

A data amount of the OTF to be stored is enormous if the proper image restoration filter is generated for each partial area of the designated image. Japanese Patent Laid-Open No. ("JP") 2012-073691 discloses a method for reducing a data amount to be stored by storing coefficient data used to reconstruct an OTF for each image pickup condition and for each image height. However, this method causes a heavy calculation burden so as to reconstruct the OTF for each image height and for each focus state using the coefficient data.

U.S. Pat. No. 4,410,804 discloses an image capturing apparatus in which one pixel in an image sensor includes one micro lens and a converter that is divided into a plurality of areas. The divided photoelectric converter receives light fluxes from partial areas (partial pupil areas) that are different from one another in the exit pupil in the image capturing optical system via one micro lens. A plurality of parallax images having parallaxes that are different from one another can be generated through the plurality of partial pupil areas by using the photoelectric conversion signals output from these divided photoelectric converters. Light field (LF) data as a spatial distribution and an angular distribution of the light intensity information can be acquired using the plurality of thus generated parallax images. An image that focuses on a virtual imaging plane different from an image capturing plane in capturing the plurality of parallax images can be generated using the LF data.

JP 2001-083407 discloses an image capturing apparatus configured to generate one captured image by summing up all photoelectric conversion signals from the above divided photoelectric converters.

As described above, in order to generate the proper image restoration filter in the focus state at each of all image heights in the deteriorated image, the OTF data to be stored is enormous and a calculation burden becomes heavy.

SUMMARY OF THE INVENTION

The present invention provides an image processing apparatus, an image capturing apparatus, etc. which can reduce a data amount to be stored and provide an image restoration process for each partial area in an image according to focus state.

An image processing method according to one aspect of the present invention includes the steps of obtaining information on an optical transfer function used for image capturing, generating correction information used to correct the optical transfer function based on a first image generated by the image capturing and a second image that is focused on a defocus area in the first image, and performing a filter process for the first image using the correction information and information on the optical transfer function.

Further features of the present invention will become apparent from the following description of exemplary embodiments with reference to the attached drawings.

DESCRIPTION OF THE EMBODIMENTS

Figure 1:
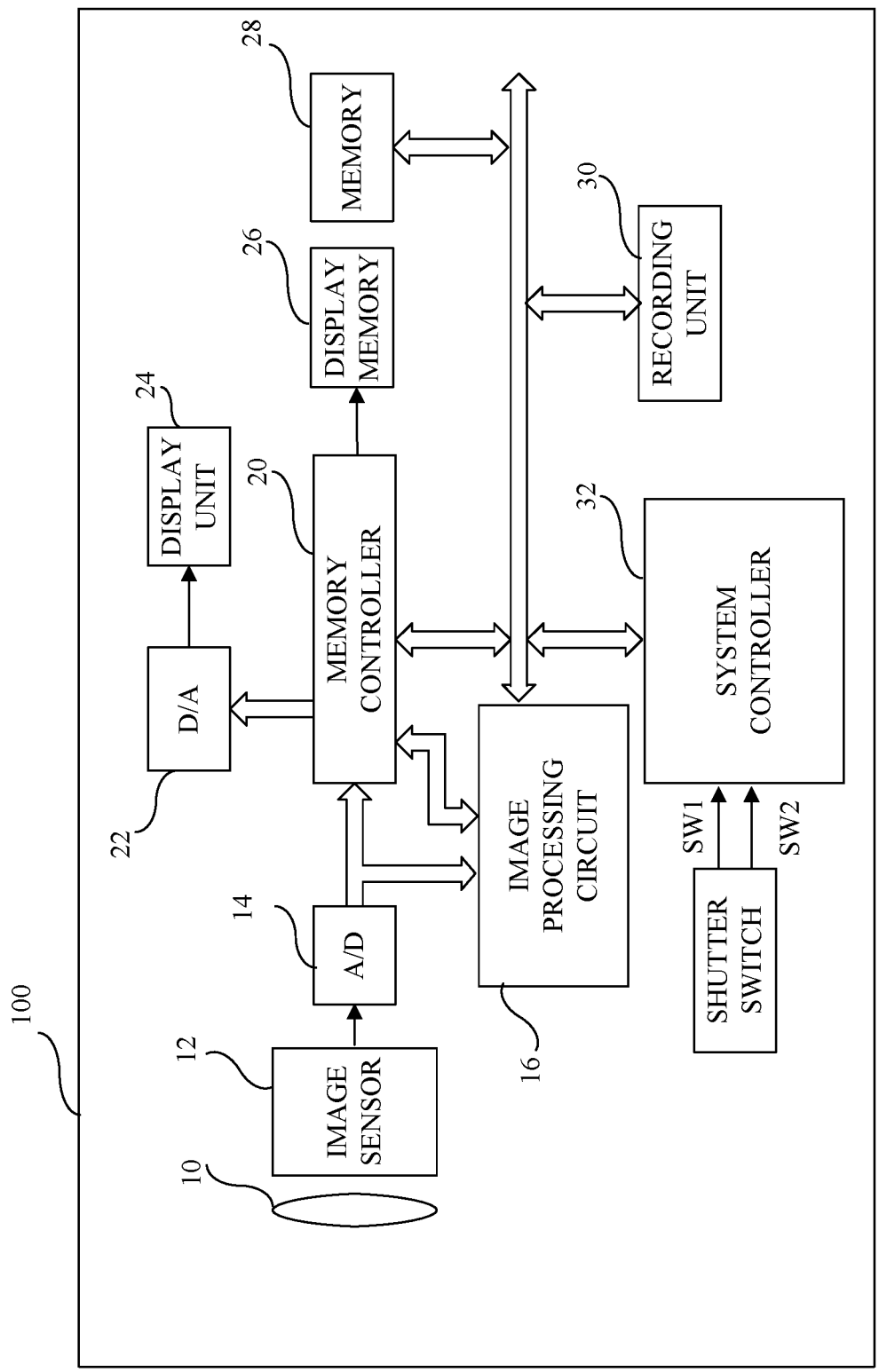
FIG. 1 is a block diagram illustrating a configuration of an image capturing apparatus according to an embodiment of the present invention.

Referring now to the accompanying drawings, a description will be given of embodiments according to the present invention.

Initially, definitions of terms used for the embodiment and an image restoration process will be given.

[Input Image]

An input image (first image) is a digital image generated based on an output from an image sensor that has photoelectrically converted an object image formed by an image capturing optical system in an image capturing apparatus. The input image is, for example, a RAW image having information of RGB color components. The input image is an image deteriorated by the OTF that contains an aberration, of the image capturing optical system that includes an optical element, such as a lens and an optical filter.

The image capturing optical system may include a mirror (reflective surface) having a curvature. The image capturing optical system may be attached to and detached from the image capturing optical apparatus. An image capturing system in the image capturing apparatus includes an image sensor, and a signal processing circuit configured to generate the input image using the output of the image sensor. The image sensor includes a photoelectric conversion element, such as a CMOS sensor and a CCD sensor.

The input image and output image may contain an image capturing condition, such as a focal length, an F-number, and an object distance (or image capturing distance) of the image capturing optical system, and various correction information configured to correct the input image.

[Image Restoration Process]

Assume that $g(x, y)$ is an input image (deteriorated image) generated by an image capturing apparatus, $f(x, y)$ is an original image (non-deteriorated image), and $h(x, y)$ is a PSF as a Fourier transform pair of the OTF. Then, the following expression (1) is established, where * denotes a convolution and $(x, y)$ denotes a coordinate (position) on the input image.

$$g(x,y)=h(x,y)*f(x,y) \quad (1)$$

When this expression (1) is Fourier-transformed into an expression form on a frequency plane, a product form is obtained for each frequency as in the following expression (2). $H(u, v)$ is the OTF obtained by Fourier-transforming $h(x, y)$ as the PSF. $G(u, v)$ and $F(u, v)$ are functions obtained by Fourier-transforming $g(x, y)$ and $f(x, y)$. $(u, v)$ is a coordinate on a two-dimensional frequency plane or the frequency.

$$G(u,v)=H(u,v)\cdot F(u,v) \quad (2)$$

In order to obtain the original image from the deteriorated image, both sides in the expression (2) are divided by $H(u, v)$ as in the following expression (3).

$$G(u,v)/H(u,v)=F(u,v) \quad (3)$$

The restored image corresponding to the original image $f(x, y)$ is obtained by inversely Fourier-transforming $F(u, v)$ or $G(u, v)/H(u, v)$ so as to reconvert it to the real plane.

Assume that R is an inverse Fourier transform of $H^{-1}(u, v)$. Then, a convolution process with an image on the real plane is performed as in the following expression (4) so as to acquire the restored image as the original image $f(x, y)$.

$$g(x,y)*R(x,y)=f(x,y) \quad (4)$$

$R(x, y)$ in the expression (4) is an image restoration filter. In general, when the input image is a two-dimensional image, an image restoration filter is also a two-dimensional filter having taps (cells) corresponding to pixels in the two-dimensional image. In principle, as the image restoration filter has more taps (cells), the image restoration precision improves. A practical tap number is set according to a required image quality of an output image, an image processing ability in the image processing apparatus, a spread width of the PSF, etc.

The image restoration filter needs to reflect at least a diffraction characteristic, and quite differs from the conventional edge enhancement filter (high-pass filter) having about three taps in the horizontal and vertical directions. The image restoration filter is generated based on the OTF, and can highly precisely correct both the amplitude and phase components in the deteriorated image or input image.

The actual input image contains a noise component. When the image restoration filter prepared by a complete inverse of the OTF as described above is used, the noise component is remarkably amplified although the deteriorated image is restored. This is because the MTF (amplitude component) of the image capturing optical system is reconverted to 1 over all frequencies, when the noise amplitude is added to the amplitude component of the input image. Although the MTF as the amplitude deteriorated by the image capturing optical system is reconverted to 1, the power spectrum of the noise component is amplified and the noise is amplified according to the restoration gain or the MTF amplification degree. Thus, a well restored image cannot be obtained as an appreciation image from the input image having a noise component.

A conventional method for restoring an image having a noise component controls a restoration degree according to a signal to noise ratio (SNR) like a Weiner filter expressed in the expression (5), for example.

$$M(u, v) = \frac{1}{H(u, v)} \frac{|H(u, v)|^2}{|H(u, v)|^2 + SNR^2} \quad (5)$$

$M(u, v)$ indicates a frequency characteristic of the Weiner filter, and $|H(u, v)|$ indicates an absolute value (MTF) of the OTF. In this embodiment, $M(u, v)$ in the expression (5) indicates the frequency characteristic of the image restoration filter. This method limits the restoration gain for each frequency as the MTF becomes smaller, and increases the restoration gain as the MTF becomes larger. In general, the MTF of the image pickup optical system is high on the low frequency side and low on the high frequency side. Hence, this method restrains the restoration gain substantially on the high frequency side of the image signal.

First Embodiment

FIG. 1 illustrates a configuration of a digital camera (simply referring to as a "camera" hereinafter) as an image capturing apparatus according to an embodiment of the present invention. The camera 100 includes an image sensor 12 that can acquire a captured image and simultaneously obtain a plurality of parallax images having parallaxes that are different from each other.

An image capturing optical system (referred to as an "image capturing lens" hereinafter) 10 forms an optical image (object image) on an image capturing plane of an image sensor 12. The image sensor 12 includes a CMOS sensor, etc., and outputs an analog image signal by converting the object image into an electric signal. An A/D converter 14 converts the analog image signal output from the image sensor 12 into a digital image signal.

An image processing circuit 16 generates image data as a captured image (first image) by performing a predetermined image process, such as a demosaic process and a color conversion process, for a digital image signal from an A/D converter 14 or a digital image signal from a memory controller 20. The image processing circuit 16 and the image sensor 12 constitute an image capturer.

The image processing circuit 16 acquires the following refocus image (second image) and OTF data, generates the following OTF correction value, and an image restoration process. The image processing circuit 16 includes an integrated circuit (ASIC) that includes circuits of specific processes. A system controller 32 performs a process according to a program read out of an unillustrated ROM, and the system controller 32 may serve as part or all of the functions of image processing circuit 16. When the system controller 32 serves as all of the functions of image processing circuit 16, the image processing circuit 16 does not have to be configured as a hardware.

A memory controller 20 controls the A/D converter 14 and the image processing circuit 16. The digital image signal output from the A/D converter 14 is stored as display image data in a display memory 26 or a memory 28 via the image processing circuit 16 and the memory controller 20 or via the memory controller 20 without intervening the image processing circuit 16.

The display image data stored in the display memory 26 is converted into an analog signal by a D/A converter 22, and then displayed on a display unit 24. A so-called live-view function can be realized by displaying the sequentially generated display image data on the display unit 24.

The memory 28 stores a still image and a motion image for recording purposes, which are generated by image capturing, and has a sufficient storage capacity for storing a predetermined number of still images and an motion image for a predetermined time period. The memory 28 also store OTF data 110 for generating the image restoration filter. This configuration enables a large amount of image data can be quickly stored in the memory 28 in a continuous capturing mode that continuously captures an object and generates a plurality of still images. The memory 28 is also used for a working area for the system controller 32.

The system controller 32 controls the entire operations of the camera 100. An image capturing preparation switch SW1 is turned on by a half-press operation of an unilluminated shutter button. When the image capturing preparation switch SW1 is turned on, a start of an image preparation operation is designated, such as an autofocus (AF) process, an auto exposure (AE) process, an auto white balance (AWB) process, and an electronic flash (EF) process.

An image capturing start switch SW2 is turned on by a full press operation of the shutter button. When the image capturing start switch SW2 is turned on, an image capturing and recording operation starts. In other words, the image capturing signal from the image sensor 12 is sent to the image processing circuit 16 via the A/D converter 14 or via the A/D converter 14 and the memory controller 20. The image processing circuit 16 performs predetermined image processing for an image signal and generates image data to be recorded, performs a compression process for the image data and stores the compressed image data in an external memory, such as a recording medium or memory card, attached to and detached from the camera 100.

Figure 2:
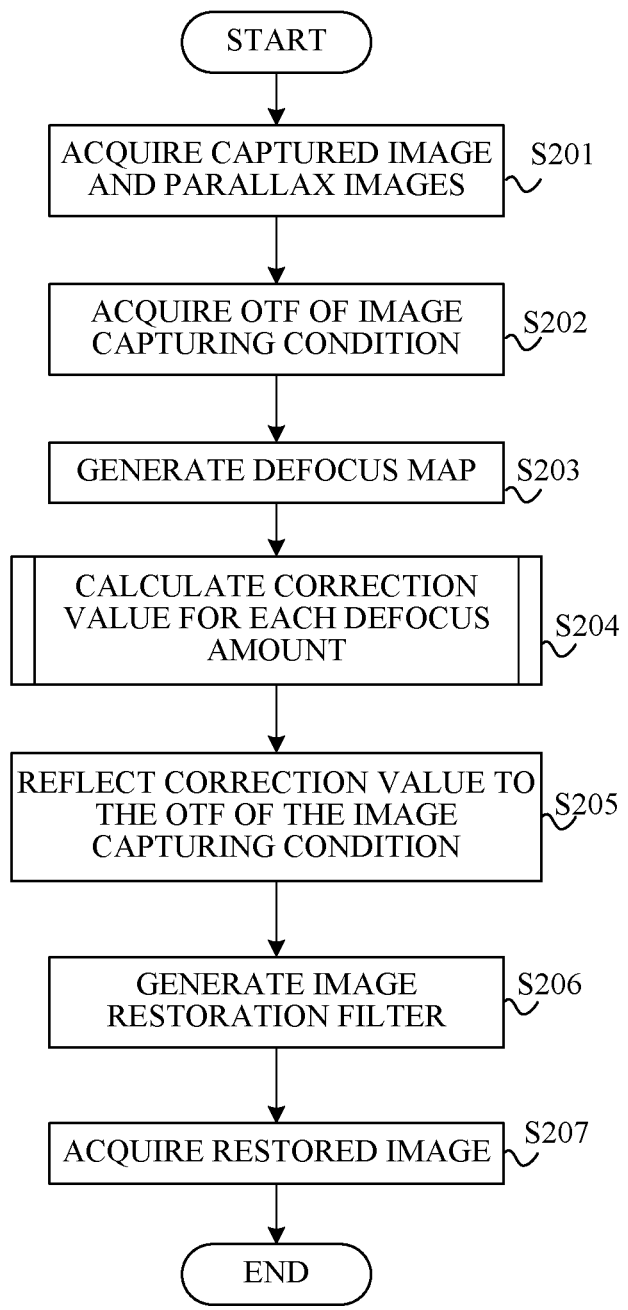
FIG. 2 is a flowchart illustrating image processing performed in this embodiment.

FIG. 2 illustrates a flowchart of image processing performed by the image processing circuit 16 in this embodiment. The image processing circuit 16 includes a computer and executes this process in accordance with an image processing program as a computer program.

Initially, in the step S201, the image processing circuit 16 acquires a captured image (image data) as an input image and a plurality of parallax images. The image sensor 12 divides the exit pupil of the image capturing lens 10 into a plurality of partial pupil areas (or divides the pupil), and simultaneously acquires a plurality of parallax images having parallaxes that are different from each other through the plurality of partial pupil areas. More specifically, each of all effective pixels (a plurality of pixels) of the image sensor 12 includes one micro lens and a plurality of divided photoelectric converters (referred to as "sub pixels" hereinafter), and each sub pixel receives light from a corresponding partial pupil area via the micro lens. A plurality of parallax images having a plurality of parallaxes that are different from each other and a resolution corresponding to the effective pixel number can be generated using the photoelectric conversion signals output from the sub pixels.

Figure 4:
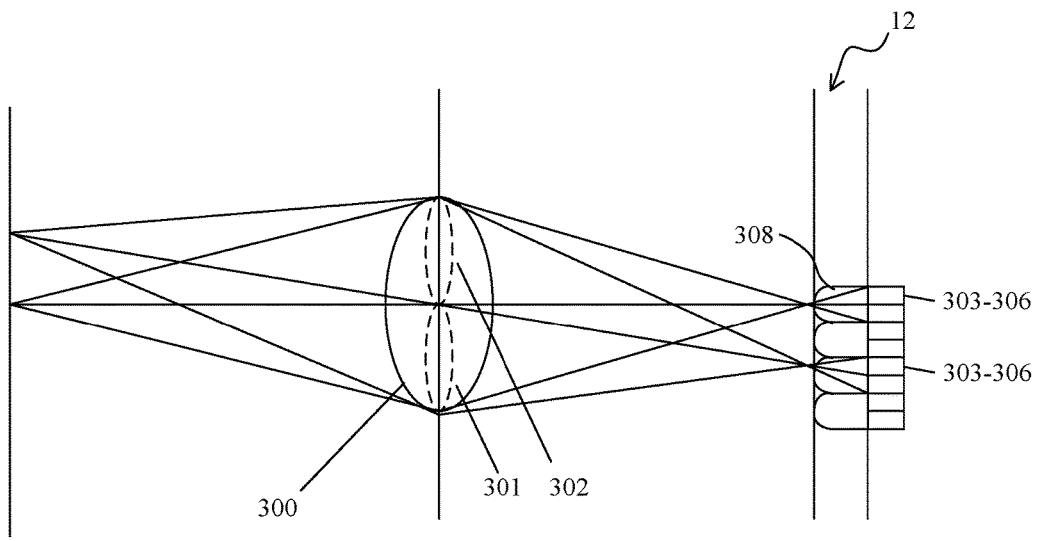
FIG. 4 is a view illustrating a pupil division on an image sensor according to this embodiment.

FIG. 4 illustrates a pupil division by the image sensor 12 according to this embodiment. An exit pupil 300 of the image sensor 12 is divided into a plurality of partial pupil areas 301 and 302. Light fluxes that have passed partial pupil areas 301 and 302 that are different from each other enter pixels in the image sensor 12 at different angles, and are received by $N\theta \times N\theta$ (=Np) (such as 2×2 divided) divided sub pixels 303 to 306 via the micro lens 308 provided to each image. The LF data can be acquired which indicates a spatial distribution and angular distribution of the light intensity, by using the photoelectric conversion signals from the sub pixels 303 to 306. A parallax image corresponding to a specific partial pupil area among a plurality of partial pupil areas can be acquired by selecting the photoelectric conversion signal from one specific sub pixel among a plurality of sub pixels in each pixel and this LF data. Thus, when each pixel on the image sensor 12 includes $N\theta \times N\theta$ (=Np) divided sub pixels, Np parallax images having mutually different pixels can be acquired.

A captured image can be generated with a resolution corresponding to an effective pixel number by summing up all signals from a plurality of sub pixels for each pixel in the image sensor 12 and by setting it to an output of one pixel.

In the step S202, the image processing circuit 16 acquires from the memory 28 the OTF data as information on the OTF corresponding to the image capturing lens 10.

The OTF data in this embodiment is data representing information on the OTF calculated from the design value of the image capturing lens 10 when the image capturing lens 10 is focused on each of a plurality of discretely selected specific object distances. The OTF data is data representing information on the OTF at a plurality of specific frequencies discretely selected in a specific frequency range. The OTF data is two-dimensional data arranged at a plurality of specific positions (discrete image heights) in a plurality of radial directions from the center of the image (optical axis position of the image capturing lens 10). As described above, the OTF is different according to the image height, but a data amount is enormous if the OTF data is prepared for all image heights in the image (all pixels). Hence, the OTF data at discrete specific image heights are stored in the memory 28. The OTF data at image heights other than the discrete specific image height is obtained by the interpolation, such as a linear interpolation, using the OTF data at two or more specific image heights near the image height.

The OTF data may be data of the OTF itself or PSF data obtained by inversely Fourier-transforming the OTF. This embodiment sets the OTF data to coefficients in a polynomial that approximates the OTF. Thereby, a data amount to be stored can be less than that when the OTF and PSF data is stored.

A maximum frequency value in the specific frequency range in which the OTF data is stored may be maintained comparatively high. In this stage, the characteristic of the image capturing apparatus is unstable, and thus an elastic treatment is necessary for the subsequent processes. Thereafter, the OTF data in a necessary frequency range is extracted according to the characteristic of the image capturing apparatus, such as the Nyquist frequency.

This embodiment stores the OTF data at specific image heights discretely arranged in the entire image, but the specific image height may be discretely arranged only part of the image and the OTF data at the specific image heights may be stored.

Next, in the step S203, the image processing circuit 16 generates a defocus map for the captured image using a plurality of parallax images acquired in the step S201. More specifically, the image processing circuit 16 calculates a phase difference between pixels (referred to as "corresponding pixels" hereinafter) corresponding to respective pixels in the image sensor among a plurality of parallax images, and calculates a defocus amount d based on the phase difference. The defocus map is generated by arranging data of the defocus amount d calculated for all corresponding pixels according to the pixel arrangement on the image sensor.

This embodiment maps defocus amount data but it is unnecessary to map the defocus amount data itself. For example, since the defocus amount corresponds to the object distance, the object distance may be mapped instead of the defocus map. In order to obtain the defocus amount and the object distance, a focus detection apparatus and a distance measurement apparatus may be provided separately from the image sensor 12 or the object distance may be calculated by the distance measurement apparatus that is externally attached to the camera 100. The user may input the object distance.

Next, in the step S204, the image processing circuit 16 refers to the defocus map generated in the step S203, and divides the captured image into a plurality of partial areas (referred to as "defocus areas" hereinafter) having defocus amounts d that are different from each other. Each defocus area includes at least one pixel of a certain defocus amount. The image processing circuit 16 calculates an OTF correction Hd as correction information as correction information for correcting the OTF data according to the defocus amount in the defocus area for each defocus area. A detailed description will be given of a calculation of the OTF correction value Hd later.

Next, in the step S205, the image processing circuit 16 corrects the OTF data based on the correction value Hd for each defocus area. More specifically, the corrected OTF data is generated by multiplying the OTF data by the correction value Hd. In this case, the image processing circuit 16 extracts the OTF data used for the subsequent image restoration process according to the characteristic value of the image sensor 12 previously stored in the memory 28 (Nyquist frequency calculated based on the pixel pitch of the image sensor 12). The image processing circuit corrects the extracted OTF data based on the correction value Hd. The image processing circuit 16 finally adjusts the OTF data by multiplying the pre-correction or post-correction OTF data by a deteriorated characteristic caused by an opening in each pixel of the image sensor 12 or an unillustrated optical low-pass filter provided in a front surface of the image sensor 12. The OTF data is thus generated according to the defocus amount in the defocus area (referred to as a "defocus correction OTF data" hereinafter).

Next, in the step S206, the image processing circuit 16 generates an image restoration filter having a frequency characteristic illustrated in the Expression (5) using the defocus correction OTF data. The image restoration filter is generated as a two-dimensional filter of a real number by inversely Fourier-transforming M(u, v) in the expression (5).

Next, in the step S207, the image processing circuit 16 applies (convolutes) the image restoration filter to (with) the captured image for the image restoration process, and acquires the restored image.

Figure 3:
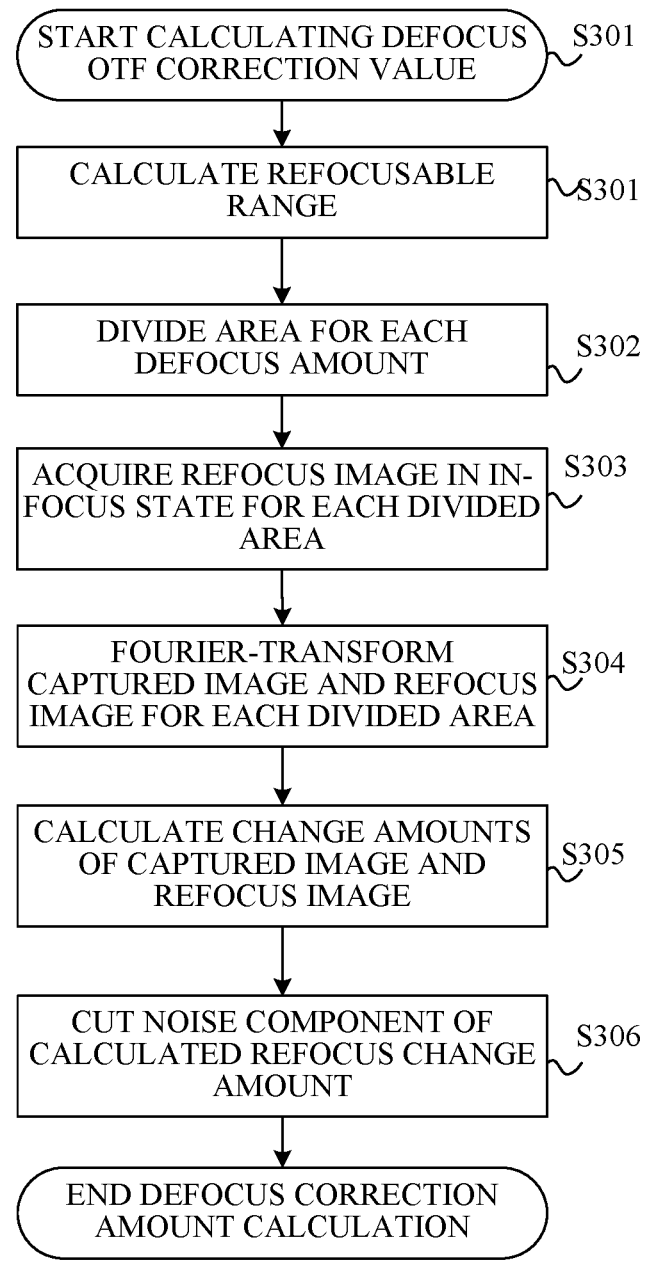
FIG. 3 is a flowchart illustrating a calculation process of an OTF correction value in a defocus area according this embodiment.

Referring now to the flowchart in FIG. 3, a description will be given of a calculation of the OTF correction value for each defocus area in the step S204.

Initially, in the step S301, the image processing circuit 16 calculates the refocusable area.

Figure 5:
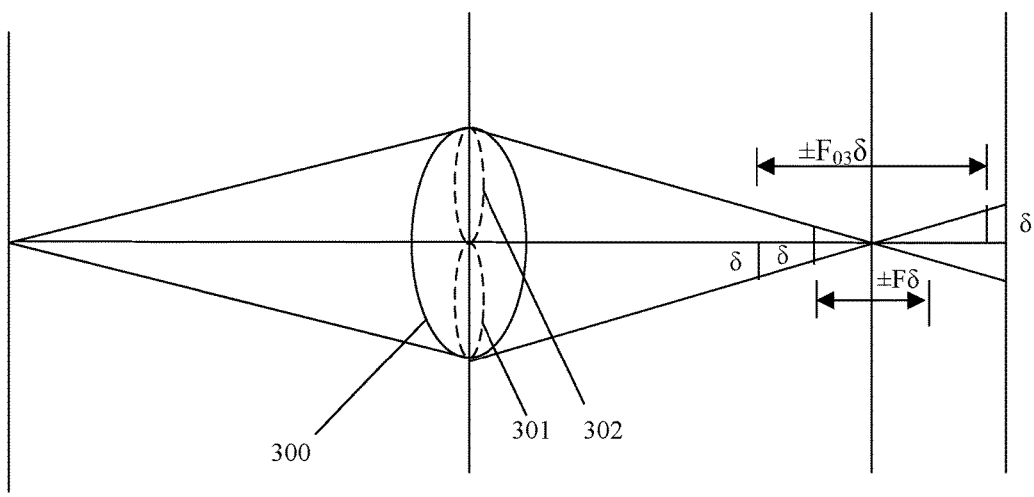
FIG. 5 is a view illustrating a refocusable range according to this embodiment.

FIG. 5 illustrates the refocusable range according to this embodiment. Now assume that $\delta$ is a permissible circle of confusion and F is an F-number of the image capturing lens 10. Then, $\pm F\delta$ is a depth of field with the F-number. An effective F-number F' (=F01 to F04) in the N$\theta \times$N$\theta$ (=2×2) divided and narrowed partial pupil areas darkens as N$\theta$F, and the effective depth of field in each parallax image becomes $\pm$N$\theta$F$\delta$ that is deeper than $\pm F\delta$ by N$\theta$ times. In other words, a range of a defocus amount that can be considered to be in-focus widens by N$\theta$ times.

An object image that focuses on each parallax image is formed in the range of the effective depth of field $\pm$N$\theta$F$\delta$. Hence, as described later, the in-focus position can be readjusted (for a refocus) after the captured image is obtained (after image capturing) by a refocus process configured to move the parallax image parallel to the light flux that enters each sub pixel at an angle, as described later. Since only a blurred object image is formed on each parallax image outside the range of the effective depth of field $\pm$N$\theta$F$\delta$, the in-focus position cannot be readjusted (for a refocus).

Therefore, the defocus amount d from the image capturing plane approximately falls in the following refocusable range after the image capturing.

$$|d| N\theta F\delta \qquad (6)$$

The permissible circle of confusion $\delta$ is defined as follows, for example, with an inverse of a Nyquist frequency $1/(2\Delta X)$ where $\Delta X$ is a pixel pitch of the image sensor.

$$\delta = 2\Delta X \qquad (7)$$

This embodiment sets to a refocusable range a range of the defocus amount d that satisfies the expression (7).

Next, in the step S302, the image processing circuit 16 divides the refocusable range calculated in the step S301 for each defocus amount d. Since the OTF correction value Hd in the defocus area differs for each defocus amount d, the OTF correction value Hd is calculated in a refocusable range divided by the defocus amount d. No correction is performed outside the refocusable range. A refocusable part R(d) is part corresponding to the defocus amount d in the refocusable range.

Next, in the step S303, the image processing circuit 16 performs a refocus process for each parallax image for each refocusable part R(d) divided by the step S302. Thereby, a refocus image is generated (acquired) as one or more second images that are configured to focus on (an object in) one or more defocus areas in the captured image.

Figure 6:
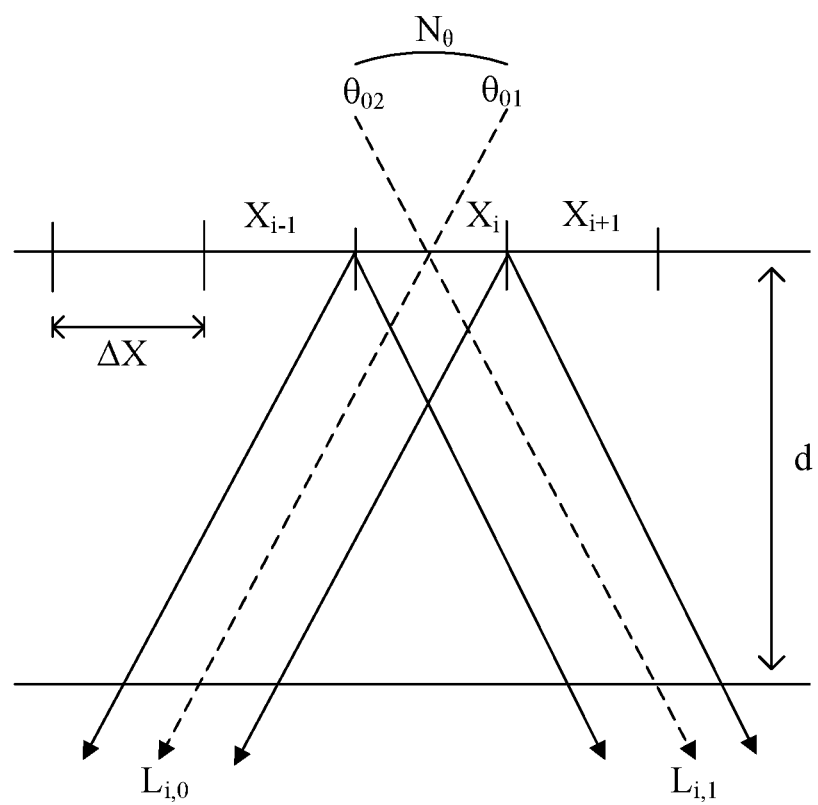
FIG. 6 is a view illustrating a refocus process according to this embodiment.

FIG. 6 illustrates the refocus process according to this embodiment. FIG. 6 typically illustrates as a line segment a pixel Xi (i=0 to NLF−1) arranged on the image capturing plane of the image sensor 12. A light flux that enters an i-th pixel Xi at an angle θa (a=0 to Nθ−1) is received by a sub pixel in the pixel Xi. Now assume that Li, a (a=0 to Nθ−1) is a photoelectric conversion signal (referred to as a "sub pixel signal" hereinafter) from a sub pixel that has received the light flux at the incident angle θa.

When a plurality of parallax images acquired with the image sensor 12 according to this embodiment are used, the LF data as the spatial distribution and the angular distribution information of the light intensity can be acquired. Thus, after image capturing, a refocus process configured to generate a refocus image that focuses on a virtual imaging plane different from the image capturing plane of the image sensor 12 (imaging plane used to acquire the sub pixel signal Li, a) based on the LF data. More specifically, all sub pixel signals Li, a in the parallax images are moved from the image capturing plane to the virtual imaging plane parallel to the light flux incident on the sub pixel at an angle θa to which the sub pixel signal Li, a is output. A refocus image can be generated on the virtual imaging plane by distributing all the sub pixel signals Li, a to the virtual pixels on the virtual imaging plane through a weighted addition. All coefficients used for the weighted addition are positive and their sum total is 1.

Next, in the step S304, the image processing circuit 16 Fourier-transforms an in-focus area of the refocus image corresponding to the refocusable part R(d) and a defocus area in the captured image corresponding to the in-focus area, for each refocusable part R(d). Now assume that Fd(u, v) is a Fourier transform result (first transformed data) for the defocus area fd(x, y){x,y∈R(d)} in the captured image, and Gd(u, v) is a Fourier transform result (second transformed data) for the in-focus area in the refocus image.

Next, in the step S305, the image processing circuit 16 calculates a difference (change amount) between the in-focus area in the refocus image and the defocus area in the captured image. The change amount Hd(u, v) is calculated by the following expression (8).

$$Hd(u,v)=Fd(u,v)/Gd(u,v) \quad (8)$$

Next, in the step S306, the image processing circuit 16 removes a noise component by cutting a signal component higher than the specific frequency in the change amount Hd(u, v) calculated in the step S305. H(u, v) from which the noise component has been removed is defined as an OTF correction value Hd of the defocus amount d for the defocus area. The OTF data is corrected based on the OTF correction value Hd in the step S205 as described above.

As described above, this embodiment uses the difference (change amount) between the captured image and the refocus image to calculate a correction value (OTF correction value) of the OTF data for generating the image restoration filter according to the defocus amount in the defocus area in the captured image. The image restoration process using the image restoration filter can well correct (restore) the deteriorated image quality in the defocus area. In addition, it is unnecessary to previously store the OTF data for all object distances (defocus amounts) in the memory, and thus a data amount to be stored can be reduced.

This embodiment calculates the OTF correction value for each defocus amount, but the specific object, such as an organ (a face and an eye), in the captured image may be extracted, and the OTF correction value may be calculated only for the image area that contains the extracted specific object.

This embodiment performs the image restoration process using the image restoration filter generated with the defocus correction OTF data obtained by correcting the original OTF data based on the OTF correction amount (correction information). However, the defocus correction image restoration filter may be acquired by correcting the image restoration filter generated from the original OTF data using the correction information, and the image restoration process may be performed with the defocus correction image restoration filter. The image restoration process as a prior process may be performed using the image restoration filter generated from the original OTF data, and the defocus correction restoration image may be generated by performing a correction process using the correction image for the thus obtained restored image. In this case, both the image restoration process as the prior process and the subsequent correction process can be regarded as the image restoration process.

This embodiment illustratively uses the image sensor 12 that can simultaneously acquire a plurality of parallax images, but the present invention is not limited to this embodiment and may use a sensor that cannot acquire the parallax images simultaneously, such a normal CMOS sensor. In this case, distance information of an object included in an image can be obtained based on focus evaluation values in continuously captured images obtained by moving the focus lens in the image capturing lens and continuously capturing images. When a captured image in which the specific object is defocused is compared with a captured image in which the specific object is focused based on the continuously captured images, the OTF correction value can be calculated for the specific object in the captured image in which the specific object is defocused.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This embodiment can provide a good image restoration process to a defocus area in a first image while reducing a data amount to be stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-171719, filed Sep. 1, 2015, which is hereby incorporated by reference herein in its entirety.

What is claimed is:

1. An image processing method comprising:
obtaining a first image and a second image, wherein a first area, which is included in the first image, is a defocus area and a second area, which is included in the second image and corresponds to the first area, is an in-focus area;
obtaining an optical transfer function corresponding to an image capturing condition of an image capturing optical system when the first image is captured;
calculating a first change amount using a first transform data obtained by Fourier-transforming the first area included in the first image and a second transform data obtained by Fourier-transforming the second area included in the second image;
correcting the optical transfer function based on the first change amount to generate a first filter based on the corrected optical transfer function; and
performing a filter process for the first area included in the first image using the first filter.

2. The image processing method according to claim 1, further comprising:
obtaining a third image, wherein a third area, which is included in the first image, is a defocus area having a defocus amount different from a defocus amount of the first area, and a fourth area, which is included in the third image and corresponds to the third area, is an in-focus area;
calculating a second change amount using a third transform data obtained by Fourier-transforming the third area included in the first image and a fourth transform data obtained by Fourier-transforming the fourth area included in the third image;
correcting the optical transfer function based on the second change amount to generate a second corrected optical transfer function and to generate a second filter based on the second corrected optical transfer function; and
performing a filter process for the third area included in the first image using the second filter.

3. The image processing method according to claim 1, further comprising:
detecting a specific object from the first image; and
setting an area containing the specific object as the first area.

4. The image processing method according to claim 1, wherein the second image is a refocus image generated based on a plurality of parallax images having parallaxes that are different from each other, the refocus image being focused on an imaging plane different from an image capturing plane used to capture the first image.

5. An image processing apparatus comprising:
an image processing circuit; and
a memory including instructions that, when executed by the image processing circuit, cause the image processing circuit to:
obtain a first image and a second image, wherein a first area, which is included in the first image, is a defocus area and a second area, which is included in the second image and corresponds to the first area, is an in-focus area;
obtain an optical transfer function corresponding to an image capturing condition of an image capturing optical system when the first image is captured;
calculate a first change amount using a first transform data obtained by Fourier-transforming the first area included in the first image and a second transform data obtained by Fourier-transforming the second area included in the second image;
correct the optical transfer function based on the first change amount to generate a first filter based on the corrected optical transfer function; and
perform a filter process for the first area included in the first image using the first filter.

6. An image capturing apparatus comprising:
an image capturer configured to generate an image by image capturing;
an image processing circuit; and
a memory including instructions that, when executed by the image processing circuit, cause the image processing circuit to:
obtain a first image and captured by the image capturer, wherein a first area, which is included in the first image, is a defocus area and a second area, which is included in the second image and corresponds to the first area, is an in-focus area;
obtain an optical transfer function corresponding to an image capturing condition of the image capturer when the first image is captured;
calculate a first change amount using a first transform data obtained by Fourier-transforming the first area included in the first image and a second transform data obtained by Fourier-transforming the second area included in the second image;
correct the optical transfer function based on the first change amount to generate a first filter based on the corrected optical transfer function; and
perform a filter process for the first area included in the first image using the first filter.

7. A non-transitory recording medium configured to store an image processing program that operates a computer, wherein the image processing program enables the computer to:
obtain a first image and a second image, wherein a first area, which is included in the first image, is a defocus area and a second area, which is included in the second image and corresponds to the first area, is an in-focus area;
obtain an optical transfer function corresponding to an image capturing condition of an image capturing optical system when the first image is captured;
calculate a first change amount using a first transform data obtained by Fourier-transforming the first area included in the first image and a second transform data obtained by Fourier-transforming the second area included in the second image;
correct the optical transfer function based on the first change amount to generate a first filter based on the corrected optical transfer function; and
perform a filter process for the first area included in the first image using the first filter.

* * * * *